UNITED STATES PATENT OFFICE.

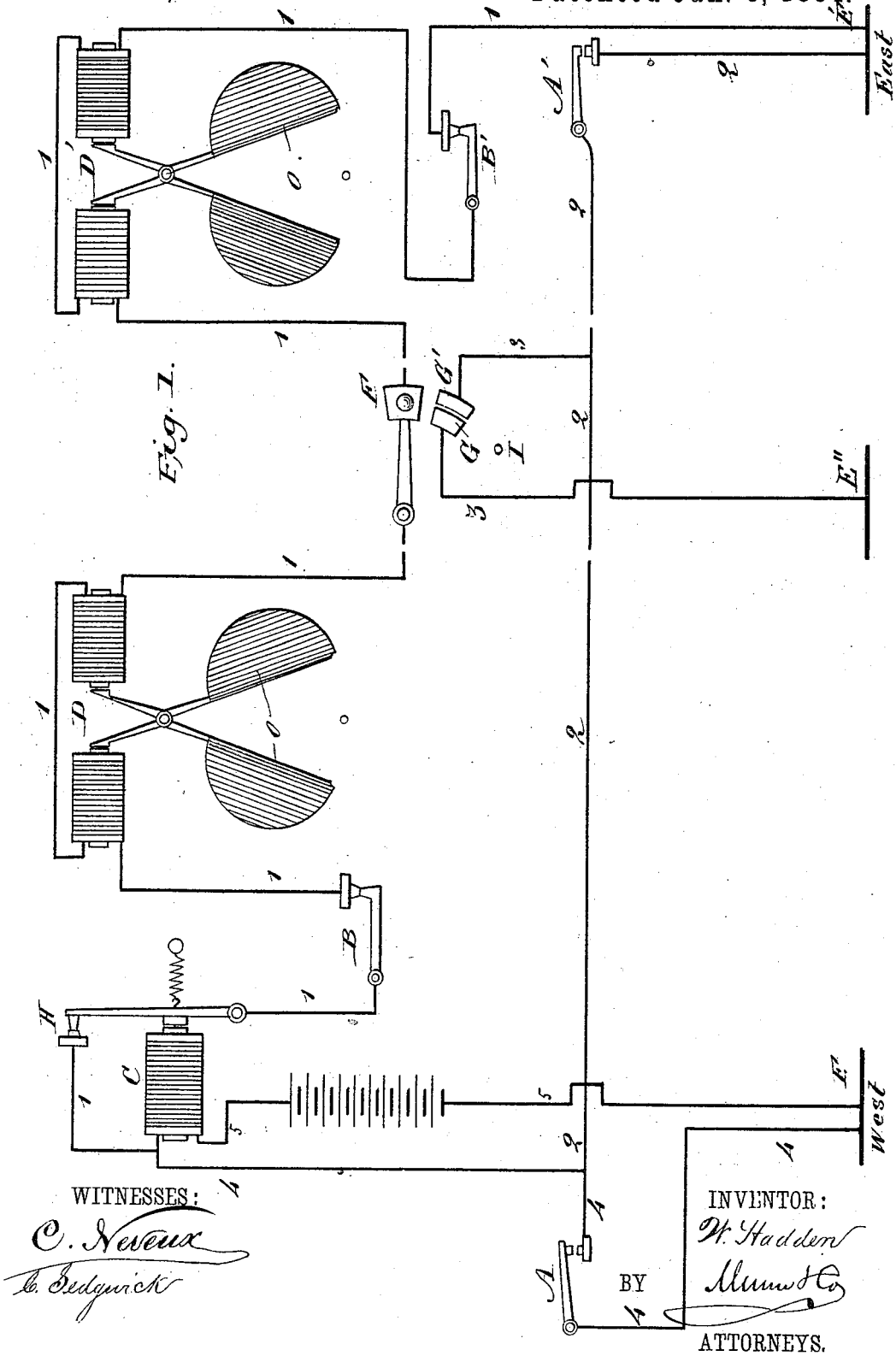

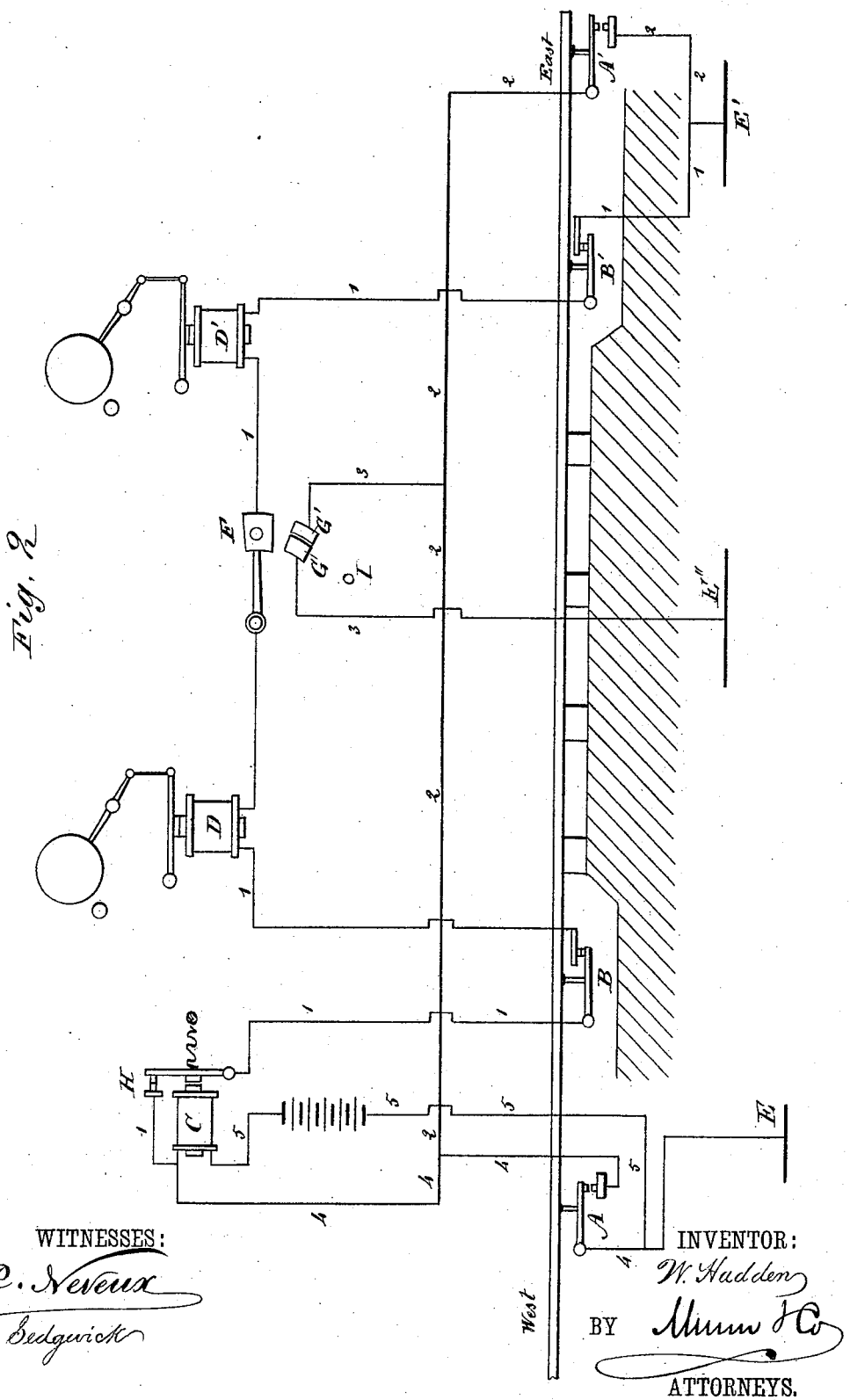

WILLIAM HADDEN, OF BROOKLYN, NEW YORK.

RAILWAY-SIGNAL SYSTEM.

SPECIFICATION forming part of Letters Patent No. 291,721, dated January 8, 1884.

Application filed February 19, 1883. (No model.)

*To all whom it may concern:*

Be it known that I, WILLIAM HADDEN, of Brooklyn, Kings county, and State of New York, have invented a new and Improved Railway-Signal System, of which the following is a full, clear, and exact description.

My invention relates to the class of railway-signals known as "block-signals;" and it consists of a novel arrangement of the circuit by which the signals are operated on a closed circuit, and worked with equal facility from either end of the section automatically, or from any portion of the line between the signal-stations, by means of a switch of peculiar construction.

Figure 1 of the drawings is a view illustrating my railway-signal system, and Fig. 2 exhibits a view of the track and circuit connections.

In describing my invention I shall describe the four different operations of the apparatus by referring to the parts as being in the first, second, third, or fourth position, as the case may be. I shall also, for the sake of convenience, refer to the opposite ends of the section as east and west, as indicated in the drawings.

In the first position the battery is on the line 5 from the ground-connection E at west end of section of railroad to be protected through the magnet C, contact-points H, wire 1, track-instrument circuit-breaker B, wire 1, through signal-magnets D, which hold the banners out of sight, switch F, wire 1, signal-magnets D', wire 1, track-instrument circuit-breaker B', wire 1, to earth-plate E'.

In the second position the train from west, by operating circuit-breaking track-instrument B, opens the circuit of the battery through magnet C, the armature-lever of which, falling back, separates contact-points H, thus breaking the circuit of battery on line 1, which releases armature of signal-magnets D and D', allowing signal-banners O to fall to "danger" position, or in sight. As the train leaves the section at the east end, the circuit-closing track-instrument A' is operated by the train forming a new circuit for the battery from earth-plate E' through wires 2 and 4, through magnet C, and battery, wire 5, to the earth-plate E. This operates the magnet C, bringing the contact-points H together, when the original circuit, through wire 1 and signal-magnets D and D', is reformed, causing armature of the signal-magnet to be attracted, when signal will be brought to clear and the banners will be out of sight.

In the third position, the train entering the section from the east operates circuit-breaking track-instrument B', which opens circuit 1, separating the contact-points H, releasing armatures of signal-magnets D and D', thereby putting signals to "danger" or in sight. As train leaves the section at west end the circuit-closing track-instrument A is operated, forming a new circuit through wire 4, magnet C, wire 5, and battery, which operates the magnet C, bringing contact-points H together again, reforming original circuit 1 through signal-magnets D and D', the armatures of which are attracted and the signal-banners brought to "safety" or out of sight.

As to the fourth position, when it is desired to operate the signals from any intermediate point by hand or otherwise, it may be done as follows: The switch F connects the two parts of circuit 1, and insures continuity of circuit 1 when in position shown in the drawings; but when thrown over to stop-point I, it opens all circuits, throwing all signals to "danger." When it is desired to replace signals at "safety," the switch F is thrown back to original position, as shown in the drawings; but while the switch-arm is on its way back, connection is made between two contact-plates, G and G', forming a new circuit through battery and magnet C from earth-plate E'', wire 3, contact-plates G and G', wire 3, wires 2 and 4, magnet C, the battery, and wire 5, to earth-plate E. This operates magnet C, bringing the contact-points H together. The switch F, in its continuous motion back toward its original position, reaches and completes circuit 1 before leaving contact-plates G and G', thus causing contact-points H to remain together, which operates signal-magnets D and D', bringing the signal-banners to "safety," or out of sight.

Having thus described my invention, what I claim as new, and desire to secure by Letters Patent, is—

1. The main signal-circuit and its signal-magnets, as herein specified, in combination with the switch F, contact-plates G G', circuit-wires 3 2 4, magnet C, battery, wires 5, and earth, as and for the purpose specified.

2. In an electric railroad-signal system, the circuit formed of the wire 4, circuit-closing track-instrument A, magnet C, and wire 5, including main-line battery, in combination with the circuit formed of the wire 1, contact-points H, circuit-breaking track-instruments B B', and signal-magnets D D', the said wire 5 and battery forming a part of the main-line circuit when the contact-points H are closed, as herein specified.

3. In an electric railway-signal system, the circuit formed by the earth-connection E', circuit-closing track-instrument A', wires 2 and 4, magnet C, battery, wire 5, and earth-connection E, the contact-points H, in combination with mechanism for operating the semaphores, as specified.

WILLIAM HADDEN.

Witnesses:
GEO. M. HOPKINS,
C. SEDGWICK.